Patented Oct. 16, 1945

2,386,959

UNITED STATES PATENT OFFICE 2,386,959

STABILIZATION OF BIS (ALKYLTHIAZYL) DISULPHIDES

Jacob Eden Jansen, Akron, Ohio, assignor to The B. F. Goodrich Company, New York, N. Y., a corporation of New York No Drawing. Application June 26, 1943, Serial No. 492,454

7 Claims. (Cl. 260—306.5)

This invention relates to the stabilization of organic disulphides and pertains more specifically to their treatment with alkali to prevent decomposition.

It has been observed that a wide variety of organic disulphides tend to decompose upon standing for fairly long periods of time at room temperature, and that the decomposition proceeds much more rapidly at higher temperatures. The instability of the disulphides has been particularly noticeable in the case of compounds having the structure R—S—S—R' in which R and R' are heterocyclic nitrogen-containing groups with the free valence on a carbon atom. These compounds, as is well-known, are accelerators for the vulcanization of rubber. Among the more important members of the class are dithiazyl disulphide, bis (4-ethylthiazyl) disulphide, di-oxazyl disulphide, dithiazolinyl disulphide, dioxazolinyl disulphide, dithiazinyl disulphide and the various homologues of these compounds.

The decomposition of the disulphides, which proceeds spontaneously if the compounds are stored at room temperature, is believed to consist principally in the conversion of the disulphides to the mercaptans. This change in the nature of the product is manifested by a decreased solubility in hydrocarbon solvents. The effectiveness of the compounds as accelerators of vulcanization is also greatly affected by this conversion. In the past it has been attempted to increase the stability of the disulphides by washing them with an aqueous alkaline solution. Such attempts, however, have resulted only in decreasing the stability of the disulphide.

I have now discovered that the stability of organic disulphides and particularly of the heterocyclic nitrogen-containing disulphides mentioned above may be greatly increased by dissolving the disulphides in a water-immiscible solvent, and washing such solution with a dilute aqueous alkaline solution. Among the solvents which may be used are benzene, hexane, gasoline, carbon tetrachloride, turpentine, and other similar compounds. It is usually desirable to make the solution fairly dilute, although I have obtained satisfactory results by using a saturated solution.

The following specific example will serve more fully to illustrate the nature of my invention. A 3% by weight solution of a freshly prepared mixture containing 85% bis (4,5-dimethylthiazyl) disulphide and 15% of bis (4-ethylthiazyl) disulphide in n-hexane was prepared. About 120 gallons of this solution were washed with about 15 gallons of a 1% aqueous solution of sodium hydroxide at room temperature. The hexane solution was then separated from the aqueous alkaline solution, and the product was recovered by evaporating the hexane. A sample of the purified product was then compared in stability with a sample of the unwashed product in an accelerated aging test by heating both samples at 80° C. for 65 hours. At the end of this time it was found that the disulphide purified by my new process was still soluble to the extent of 84% in n-hexane, while the unwashed sample was dissolved only to the extent of 51%, indicating that the unwashed sample had decomposed to three times the extent of the washed sample. When these two samples of accelerators were tested in rubber compositions, it was found that the washed sample retained the delayed-action characteristics which are typical of the disulphides, while the unwashed sample had lost this characteristic to an appreciable extent.

When stored at room temperature, of course, the difference between the washed and the unwashed disulphide is still more apparent. A sample of the unwashed disulphide decomposes appreciably after only one or two months at room temperature, whereas a washed sample shows little or no decomposition even after four months.

There is nothing critical about the concentration of the disulphide solution used in this purification process. Saturated solutions have been treated successfully. Moreover, the effectiveness of my method of purification is independent of the particular method used to prepare the disulphide. Although I have described the process carried out with sodium hydroxide solution, any other strong inorganic base may also be used. The alkali metal hydroxides have been found to be particularly valuable. Although the concentration of the aqueous alkaline solution employed is not critical, it has been found preferable to use fairly dilute solutions. If a wash solution containing more than about 5% of sodium hydroxide is used, for example, there is danger of causing further decomposition of the disulphide which it is desired to purify. It should be noted that no additional washing with water is necessary after the washing with aqueous alkaline solution, although additional washing may be provided if desired. The immiscibility of the solvents insures complete removal of the alkali from the solution of disulphide without further washing. The amount of alkali necessary for the purification of any given sample of disulphide depends upon several factors. The amount of decomposition that has already taken place in the disulfide; the concentration of the disulphide solution; and the effectiveness with which the two solutions are mixed are all important factors. Although the washing process may be carried out over a wide range of temperatures, it is preferred to carry it out at room temperature because the use of higher temperatures tends to cause excessive decomposition of the disulphide.

While I have herein disclosed a specific embodiment of my invention, there are obvious variations and modifications falling within the scope of the appended claims which will be apparent to those skilled in the art.

I claim:

1. The method of stabilizing a bis(alkylthiazyl) disulphide which comprises treating a solution of said disulphide in a water immiscible solvent with a dilute aqueous solution containing up to about 5% by weight of an alkali metal hydroxide, separating said solutions, and separating the purified disulphide from the solvent.

2. The method of stabilizing a bis(alkylthiazyl) disulphide which comprises treating a solution of said disulphide in n-hexane with an aqueous solution containing from about 1 to about 5% by weight of an alkali metal hydroxide, separating said solutions, and separating the purified disulphide from the n-hexane.

3. The method of stabilizing bis(4-ethylthiazyl) disulphide which comprises treating a solution of said disulphide in n-hexane with an aqueous solution containing from about 1 to about 5% by weight of an alkali metal hydroxide, separating said solutions, and separating the purified disulphide from the n-hexane.

4. The method of stabilizing bis(4,5-dimethylthiazyl) disulphide which comprises treating a solution of said disulphide in n-hexane with an aqueous solution containing from about 1 to about 5% by weight of an alkali metal hydroxide, separating said solutions, and separating the purified disulphide from the n-hexane.

5. The method of stabilizing a bis(alkylthiazyl) disulphide which comprises treating a solution of said disulphide in a water immiscible solvent with an aqueous solution containing from about 1 to about 5% by weight of sodium hydroxide, separating said solutions, and separating the purified disulphide from the solvent.

6. The method of stabilizing a bis(alkylthiazyl) disulphide which comprises treating a solution of said disulphide in a water immiscible solvent at room temperature with an aqueous solution containing from about 1 to about 5% by weight of sodium hydroxide, separating said solutions, and separating the purified disulphide from the solvent.

7. The method of stabilizing a bis(alkylthiazyl) disulphide which comprises treating a solution of said disulphide in a water-immiscible solvent at room temperature with an aqueous solution containing from about 1 to about 5% by weight of an alkali metal hydroxide, separating said solutions, and separating the purified disulphide from the solvent.

JACOB EDEN JANSEN.